(12) United States Patent
Sarma et al.

(10) Patent No.: US 9,208,202 B1
(45) Date of Patent: *Dec. 8, 2015

(54) SYSTEMS AND METHODS FOR DETERMINING INTEREST IN AN ITEM OR CATEGORY OF ITEMS

(71) Applicant: Amazon Technologies, Inc., Reno, NV (US)

(72) Inventors: Subramonia P. Sarma, Bellevue, WA (US); Christopher C. Battey, Edmonds, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/042,148

(22) Filed: Sep. 30, 2013

Related U.S. Application Data

(63) Continuation of application No. 12/885,319, filed on Sep. 17, 2010, now Pat. No. 8,549,013.

(51) Int. Cl.
*G06F 17/30* (2006.01)
(52) U.S. Cl.
CPC ...... *G06F 17/3053* (2013.01); *G06F 17/30017* (2013.01); *G06F 17/30861* (2013.01)
(58) Field of Classification Search
CPC .............. G06F 17/30017; G06F 17/30861
USPC ............... 707/748, 752, 753; 705/14.2, 26.1, 705/27.1, 27.2
See application file for complete search history.

(56) References Cited

U.S. PATENT DOCUMENTS

| | | | |
|---|---|---|---|
| 7,058,599 B2 * | 6/2006 | Hanks et al. | 705/27.1 |
| 7,747,705 B1 * | 6/2010 | Raja | 709/219 |
| 8,549,013 B1 * | 10/2013 | Sarma et al. | 707/748 |

OTHER PUBLICATIONS

Andrew Arnt et al., Learning to Perform Moderation in Online Forums; 2003, IEEE, 5 pages.*

* cited by examiner

*Primary Examiner* — Jean B Fleurantin
(74) *Attorney, Agent, or Firm* — Knobbe, Martens, Olson & Bear, LLP

(57) ABSTRACT

Systems and methods are provided for determining customer interest associated with an item or category of items. In some embodiments, one or more discussion forums associated with each of a plurality of items may be determined. For each item, interest criteria associated with the item may be determined based at least in part on the one or more discussion forums associated with the item. The interest criteria may include the number of user posts in the one or more discussion forums and/or the number of users who have participated in the one or more discussion forums. An interest score associated with each item may be determined based at least in part on the interest criteria. In some embodiments, interest ranking information for an item or category may be generated by comparing the interest score associated with an item or category and interest scores associated with other items or categories.

13 Claims, 8 Drawing Sheets

SYSTEMS AND METHODS FOR DETERMINING INTEREST IN AN ITEM OR CATEGORY OF ITEMS

CROSS-REFERENCE TO RELATED APPLICATION

This application is a continuation of and claims benefit of priority to U.S. patent application Ser. No. 12/885,319, entitled "SYSTEMS AND METHODS FOR DETERMINING INTEREST IN AN ITEM OR CATEGORY OF ITEMS," filed Sep. 17, 2010, which is hereby incorporated herein by reference in its entirety.

BACKGROUND

Retailers and merchants involved in electronic commerce continually strive to make it easier for customers to research products and receive information that may assist in purchasing decisions. One way to improve a customer's experience includes providing discussion forums (or discussion boards) that allow customers to exchange information with other people via dialogue in a discussion. The ever-enlarging product catalog makes discussion forums helpful when a customer tries to distinguish between products, seek out impartial advice, learn more about a product or category, share the customer's experience with or impressions of a product, or obtain other information. A merchant with a large catalog of products may offer a large number of different discussion forums on a variety of topics, which may range from very specific topics to general ones. Some forums may be more active and have a greater frequency of responses than other forums. While these forums are useful for customers to share information regarding an item or to make purchasing decisions within a category of items, activity in such forums is not typically analyzed by a merchant or retailer to determine items or categories that are of interest to customers.

BRIEF DESCRIPTION OF THE DRAWINGS

The foregoing aspects and many of the attendant advantages will become more readily appreciated as the same become better understood by reference to the following detailed description, when taken in conjunction with the accompanying drawings, wherein.

DETAILED DESCRIPTION

Figure 1:
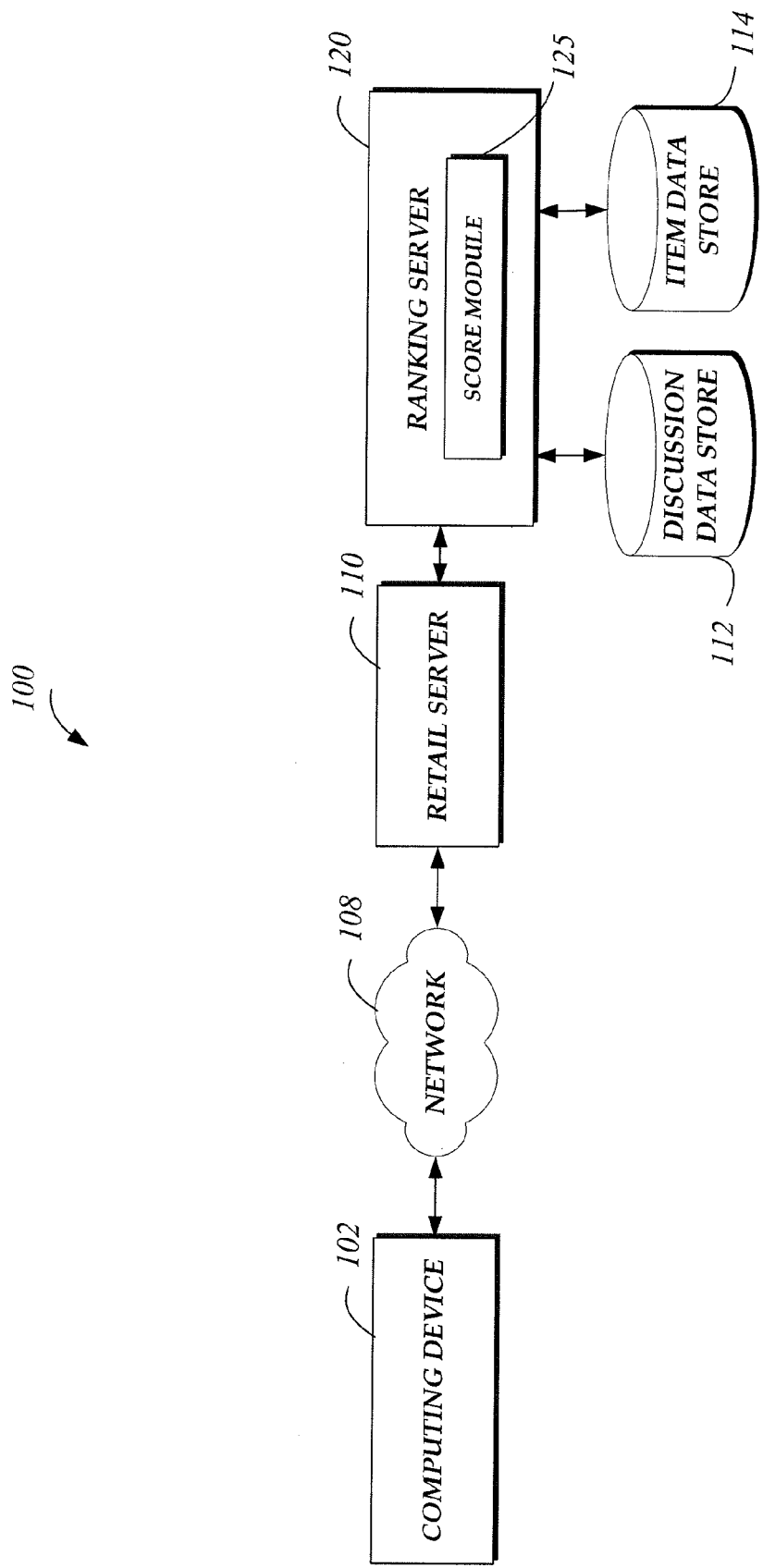
FIG. 1 is a block diagram depicting an illustrative operating environment including a retail server and a ranking server for generating customer interest ranking information for a plurality of items or categories of items.

Generally described, aspects of the present disclosure relate to determining customer interest in an item or category of items. In some embodiments, a score module as disclosed herein may be used to determine one or more discussion forums associated with each of a plurality of items. For each item, the score module may determine interest criteria associated with the item based at least in part on the one or more discussion forums associated with the item. The interest criteria may include, for example, the number of user posts in the one or more discussion forums and/or the number of users who have participated in the one or more discussion forums in a given time period. The score module may then determine an interest score associated with each item based at least in part on the interest criteria. In some embodiments, a ranking server as disclosed herein may then generate interest ranking information for an item or category of items, such as by comparing the interest score associated with an item or category and interest scores associated with other items or categories.

In some embodiments, a ranking server as disclosed herein may generally rank items or categories to reflect the relative level of interest that users have in the particular item or category relative to other items or categories. Interest in an item may be thought of, in some embodiments, as how much customer "buzz" exists regarding an item, such as how much discussion occurs among customers regarding a product or other item. Interest rankings may generally be determined based on, for example, activity in discussion forums or user review activity. In some embodiments, a ranking server as disclosed herein may additionally or alternatively generate overall "popularity" rankings of items or categories of items, which may be determined based on both customer interest levels (or "buzz"), as well as actual sales data associated with items or categories of items. As will be discussed further below, a given item may be associated with a relatively high level of customer interest, yet not have a high number of sales (for example, an item that has not yet been released to the public and/or which is not available for ordering). Conversely, a given item that is frequently purchased and would have a high sales ranking relative to other items might not be associated with much discussion or buzz (for example, an everyday product that is not particularly unique).

The forums disclosed herein may be forums associated with one or more elements or categories. Elements may generally include products, services, sellable units, user profiles, user-created content, abstract subjects, or anything else which may be organized in categories. Categories may be created and managed by an entity such as a retailer or merchant involved in electronic commerce, or any other entity which may organize elements according to one or more categorical hierarchies. The elements may be grouped or otherwise associated with one or more categories in a hierarchical organization. For example, an element may be an item available to be ordered by a customer, such as a portable DVD player. The portable DVD player may be associated with a category "DVD Players" that is itself associated with a larger category "Video." In addition, the portable DVD player may also be associated with a category "Portable Media Players" under a parallel category "Audio." It follows that elements and categories may be cross referenced to create a web of information in an electronic catalog.

Categorization may be used to enable a user to locate elements. Typically, categorization of elements follows a logical top-down organization that enables a user to quickly and intuitively locate a particular element by searching through a hierarchical catalog. For example, a user may desire to find a MP3 player in a catalog of elements. The user may begin at the top of hierarchical organization of elements and click from "electronics" to "audio," and then to "audio players," and finally to "MP3 players." Thus, in four steps, the user may be able to locate a category that contains MP3 players, which enables the user to browse possible elements that may satisfy the user's preferences. Each category may include a category page or other user interface listing information about the category, items included in the category, and/or other related information. As described herein, the term "category" may include any collection of elements, including without limitation, categories, sub-categories, classes, sub-classes, stores, departments, groups, product manufacturers, communities, product types, etc.

A category may include or be associated with one or more category forums. In some embodiments, an electronic discussion forum (sometimes referred to herein as simply a "forum") is a discussion board hosted by a server where users, utilizing computing devices in network communication with the server, may exchange messages (such as text-based messages) via posts or entries, typically continued in a dialogue format on the discussion board. In some instances, the forum may facilitate exchanging and viewing images (e.g., videos, icons, or other graphical imagery) or exchanging and/or playing audio and/or video clips. Users may either contribute to the discussion or they may read other users' entries to gain insight on the discussion topic. The category forum may be presented with a category page to display the category forum with elements in the category and allow users to interact on the category forum. In some aspects, users may exchange files or other data via a forum, either using a message board or other response-posting environment.

The category forum may include one or more discussions. Each discussion may be created, in whole or in part, based on a topic related to an element and/or a particular category associated with the element. As a result, the discussions may be related to aspects of the category, including the elements associated with the category. Therefore, in some embodiments, the category forum may be a general forum for discussing a variety of elements, each sharing a common category. In some embodiments, individual elements or items, such as individual products, may be associated with their own discussion forum. Accordingly, in some embodiments, some or all of the items available to be ordered (and/or items that have not yet been released, but for which item details are available) may each be associated with a forum that is specific to the given item.

In some embodiments, forums may be surfaced or presented on element pages, tag pages, search results pages, or other pages associated with an electronic catalog. In a collaborative environment, "tags" may be descriptors freely chosen by different users to characterize or otherwise describe attributes of an item or other element, rather than having the description controlled by a centralized classification process. For example, tags can specify properties of an element that may not otherwise be obvious from the element itself and/or which may have special meaning to a user or a subset of users.

In contrast to tags, categories typically create a hierarchical organization of a catalog of elements and are often created and/or managed by an entity such as, but not limited to, the operator of an electronic catalog. Thus, a tag page may include information about elements, categories, or other aggregated information that has been associated with a given user generated tag.

For illustrative purposes, forums are often described below in the context of an item catalog offered by a retailer. However, it should be appreciated that the described systems and methods for determining user interest in an element or category may be implemented in other contexts. For example, instead of items in an electronic catalog, the elements could be social profiles, news articles, books, photos, abstract topics, etc.

The illustrative operating environment shown in FIG. 1 includes a system 100 in which users may place orders for one or more items, as well as view and/or participate in discussions with other users. The system 100 may include a ranking server 120 that includes a score module 125 for determining interest in, and/or popularity of, items or categories of items. The environment also includes a retail server 110 that facilitates electronic browsing and purchasing of goods and services using various user devices, such as computing device 102. Those skilled in the art will recognize that the computing device 102 may be any of a number of computing devices that are capable of communicating over a network including, but not limited to, a laptop, personal computer, personal digital assistant (PDA), hybrid PDA/mobile phone, mobile phone, electronic book reader, digital media player, tablet, and the like. The ranking server 120, which will be described below in more detail, may be connected to or in communication with a discussion data store 112 that stores discussion information, which may include text, images, video, or other content corresponding to various forums. Each forum may include multiple discussions, with each discussion including one or more user posts. As discussed above, a forum may be associated with an item, a category, a tag, a community, etc. The ranking server 120 may also be connected to or in communication with an item data store 114 that stores information associated with items available for purchase through retail server 110, and/or items for which information is available to users, but which are not currently available to be ordered. In some embodiments, "purchasing" an item may include physically obtaining the item, downloading an electronic version of the item, renting or leasing a copy of the item, and/or providing streaming access to the item. Item data stored in item data store 114 may include any information related to an item that may be of interest to a user or may be useful for classifying the item. For example, item data may include, but is not limited to, price, availability, title, item identifier, item feedback (e.g., user reviews, ratings, etc.), item image, item description, item attributes, tags associated with the item, etc.

In different embodiments, discussion data store 112 and/or item data store 114 may be local to ranking server 120, may be local to retail server 110, maybe be remote from both ranking server 120 and retail server 110, and/or may be a network-based service itself. In the environment shown in FIG. 1, a user of the system 100 may utilize computing device 102 to communicate with the retail server 110 via a communication network 108, such as the Internet or other communications link. The network 108 may be any wired network, wireless network or combination thereof. In addition, the network 108 may be a personal area network, local area network, wide area network, cable network, satellite network, cellular telephone network, etc. or combination thereof. Protocols and components for communicating via the Internet or any of the other aforementioned types of communication networks are well known to those skilled in the art of computer communications and, thus, need not be described in more detail herein.

The system 100 is depicted in FIG. 1 as operating in a distributed computer environment comprising several computer systems that are interconnected using one or more computer networks. The system 100 could also operate within a computer system having a fewer or greater number of components than are illustrated in FIG. 1. Thus, the depiction of system 100 in FIG. 1 should be taken as illustrative and not limiting to the present disclosure. For example, the system 100 could implement various Web services components and peer-to-peer network configurations to implement at least a portion of the processes.

In brief, the retail server 110 is generally responsible for providing front-end communication with various user devices, such as computing device 102, via network 108. The front-end communication provided by the retail server 110 may include generating text and/or graphics, possibly organized as a user interface using hypertext transfer or other protocols in response to information inquiries received from the various user devices. The retail server 110 may obtain information on available goods and services (referred to herein as "items") from one or more data stores (not illustrated), as is done in conventional electronic commerce systems. In certain embodiments, the retail server 110 may also access item data from other data sources, either internal or external to system 100.

Figure 2:
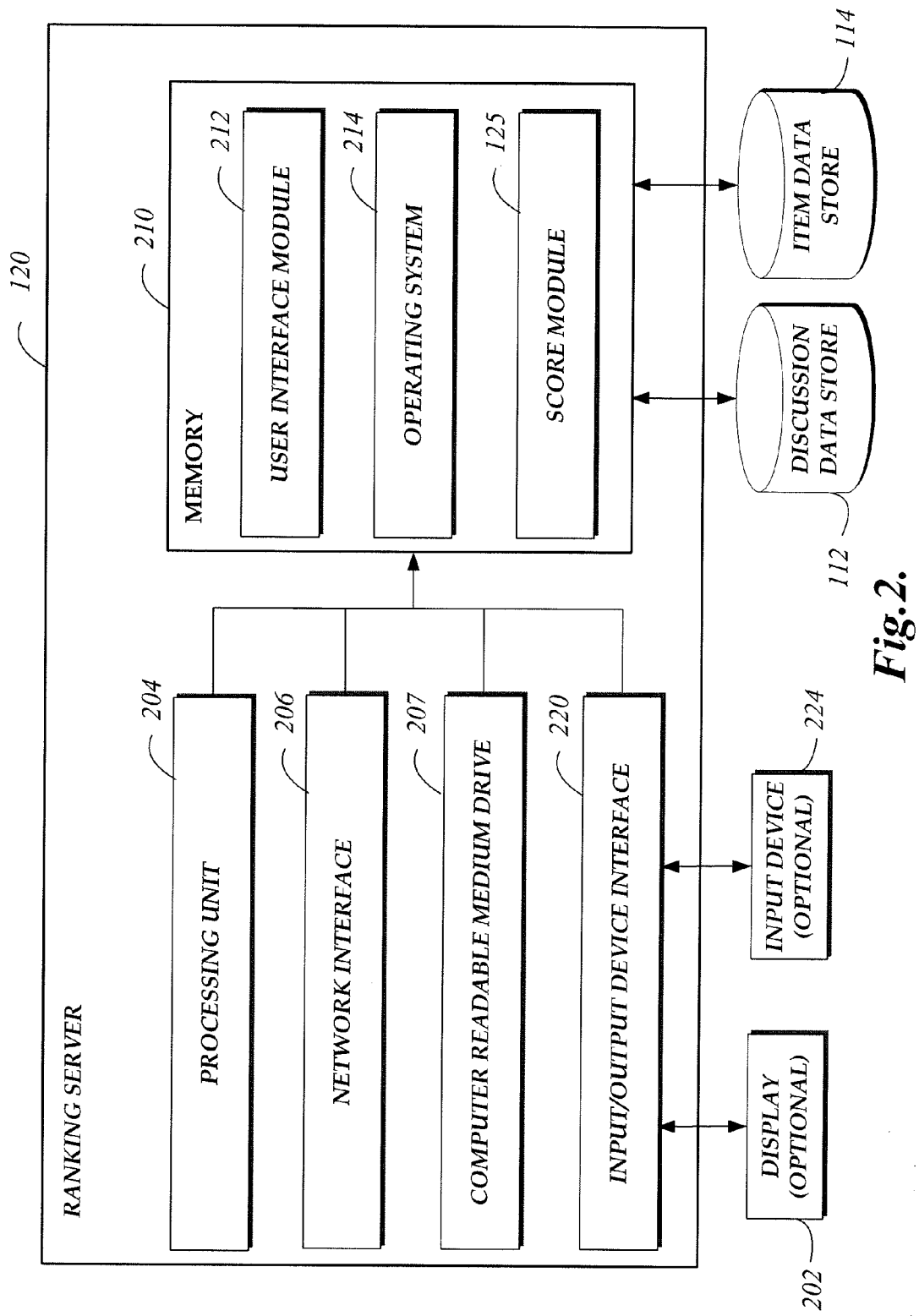
FIG. 2 depicts an example of a general architecture of a ranking server for generating item or category ranking information, including a score module for generating an interest and/or popularity score for an item or category.

FIG. 2 depicts an example of a general architecture of a ranking server 120 for generating interest ranking information and/or popularity ranking information for an item or category of items. The general architecture of the ranking server 120 depicted in FIG. 2 includes an arrangement of computer hardware and software components that may be used to implement aspects of the present disclosure. The ranking server 120 may include many more (or fewer) components than those shown in FIG. 2. It is not necessary, however, that all of these generally conventional components be shown in order to provide an enabling disclosure. As illustrated, the ranking server 120 includes a network interface 206, a processing unit 204, an input/output device interface 220, an optional display 202, an optional input device 224, and a computer readable medium drive 207, all of which may communicate with one another by way of a communication bus. The network interface 206 may provide connectivity to one or more networks or computing systems. The processing unit 204 may thus receive information and instructions from other computing systems or services via a network. The processing unit 204 may also communicate to and from memory 210 and further provide output information for an optional display 202 via the input/output device interface 220. The input/output device interface 220 may also accept input from the optional input device 224, such as a keyboard, mouse, digital pen, etc.

The memory 210 contains computer program instructions that the processing unit 204 executes in order to implement one or more embodiments. The memory 210 generally includes RAM, ROM and/or other persistent or non-transitory memory. The memory 210 may store an operating system 214 that provides computer program instructions for use by the processing unit 204 in the general administration and operation of the ranking server 120. The memory 210 may further include computer program instructions and other information for implementing aspects of the present disclosure. For example, in one embodiment, the memory 210 includes a user interface module 212 that generates user interfaces (and/or instructions therefor) for display upon a computing device, e.g., via a navigation interface such as a web browser installed on the computing device. In addition, memory 210 may include or communicate with one or more auxiliary data stores, such as discussion data store 112 and item data store 114.

In addition to the user interface module 212, the memory 210 may include a score module 125 that may be executed by the processing unit 204. In one embodiment, the score module 125 implements various aspects of the present disclosure, e.g., determining interest criteria and interest scores for an item or category, as described further below. While the score module 125 is shown in FIG. 2 as part of the ranking server 120, in other embodiments, all or a portion of a score module may be a part of the retail server 110. For example, in certain embodiments of the present disclosure, the retail server 110 may include several components that operate similarly to the components illustrated as part of the ranking server 120, including a user interface module, score module, processing unit, computer readable medium drive, etc. In such embodiments, the retail server 110 may communicate with a discussion data store and item data store, such as discussion data store 112 and item data store 114, and the ranking server 120 may not be needed in certain embodiments. Further, although certain examples are illustrated herein in the context of a retail server 110, this is not a limitation on the systems and methods described herein. For example, various embodiments of the systems and methods for generating interest ranking information for an item or category of items can be used outside of the retail context.

Figure 3:
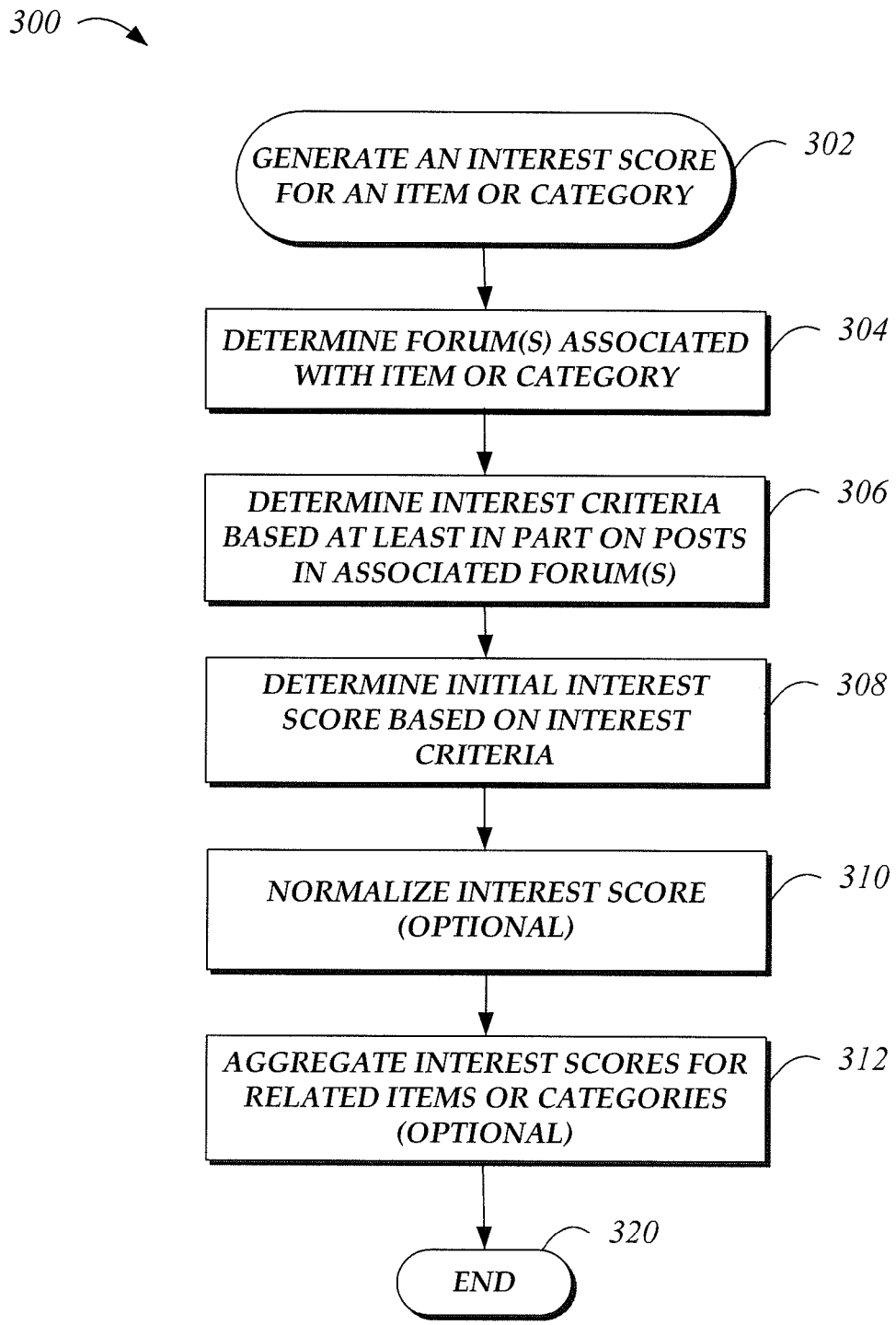
FIG. 3 is a flow diagram of an illustrative method implemented by the score module to generate an interest score for an item or category.

FIG. 3 is a flow diagram of an illustrative method 300 implemented by the score module 125 to generate an interest score for an item or category of items. For example, the illustrative method may be implemented to determine customer interest in a specific item. The illustrative method may alternatively be implemented to determine customer interest in a category of items. While an interest score will often be discussed below as associated with an item or category of items, in some embodiments, a category may broadly refer to any grouping of elements. Accordingly, in some embodiments, an interest score may be determined for a particular tag or a particular user community.

As illustrated in FIG. 3, the method begins at block 302, and then proceeds to block 304, where the score module 125 determines one or more forums associated with the item or category. The forums may be retrieved from a data store, such as discussion data store 112. In some embodiments, forums may additionally be retrieved from a third-party source, such as a discussion forum accessible from a server operated by another retailer. In some embodiments, the score module may receive an indication of a particular item or category for which the score module should determine an interest score. In other embodiments, the score module may determine interest scores for all items and/or categories stored in item data store 114, or a subset of the stored items or categories, on a regular basis (such as hourly, daily, weekly, etc.) or in response to predetermined triggering events. As discussed above, an item may be associated with one or more discussion forums specific to the item. For example, a video game system may have a discussion forum dedicated to the subject of the actual system itself, as well as a general forum related to the subject of games available to be played on that system. Similarly, a category may be associated with one or more discussion forums specific to the category. For example, a "Televisions" category may be associated with a category forum in which users can discuss televisions generally. In addition, the "Televisions" category may include a variety of sub-categories, such as "Plasma Televisions," which may each be associated with one or more forums. In some embodiments, each forum associated with a sub-category may be determined to be a forum associated with the category at block 304. In other embodiments, only forums specifically associated with the category to be scored are determined to be associated forums at block 304. In some embodiments, forums associated with sub-categories and/or related items or categories may be considered during score aggregation, discussed below in reference to block 312.

At block 306, the score module 125 determines interest criteria associated with the item or category based at least in part on posts in the one or more associated or related forums that were determined at block 304. The interest criteria may broadly include, for example, the number of posts in the one or more related forums, the number of users posting in the one or more related forums, and/or other criteria. Determining interest criteria is discussed in more detail below in reference to FIG. 4.

Once the score module 125 has determined interest criteria for the given item or category (discussed below in reference to FIG. 4), the score module determines at block 308 an initial interest score based on the interest criteria. In some embodiments, the initial interest score may be determined based on one or more of the interest criteria discussed below in reference to FIG. 4, such as by applying weights to one or more of the interest criteria. For example, in an embodiment in which the interest criteria includes the number of posts in related forums and the number of unique users that have posted in related forums, the score module may determine an initial interest score by multiplying both the number of posts in related forums and the number of unique users that have posted in related forums by predefined weights, then adding the resulting totals. As discussed below in reference to FIG. 4, one or more of the interest criteria may be decayed over time and/or be constrained to user activity that occurs in a certain period of time (for example, the past week).

Once an initial interest score has been determined, the score module 125 may normalize the initial interest score at block 310. For example, the score module may normalize the interest score to reflect the relative interest level in the given item or category based on the interest levels associated with other similar or related items or categories. In some embodiments, the score module may determine a baseline user activity level in a category of items associated with the given item, and normalize the initial interest score determined at block 308 based on this baseline activity level. Normalization in this regard may be desirable, for example, if a given item that is associated with a relatively large amount of customer buzz as compared to other similar items happens to be associated with a relatively small audience. In this manner, normalization may allow for a more accurate comparison of interest scores of items associated with different categories, rather than having items in the most popular categories with a wide customer base dominate overall item interest rankings.

In other embodiments, the score module may normalize the initial interest score without regard to interest scores or activity levels associated with related items or categories. For example, the score module may normalize the initial interest score based on the number of users that have viewed information related to the item, such as may be displayed on an item detail page (e.g., a page that includes information associated with an item, such as price, description, a photo, etc.). The score module may, for example, normalize the initial interest score by dividing the initial interest score by the number of times that users have viewed a page associated with the item or category, the number of unique users that have viewed such a page, the number of users that have viewed discussions in the related forums determined at block 304, etc.

At block 312, the score module 125 may aggregate interest scores for related items or categories. For example, once the score module determines the interest score for a given item, the score module may aggregate interest scores of all or a subset of items in the same category and/or otherwise associated with or similar to the item. Similarly, once the score module determines the interest score for a given category, such as a category that is a subset of a larger category, the score module may aggregate interest scores of all or a subset of other related categories or subcategories. For example, when the score module generates an interest score for a given book, the score module may aggregate that interest score with interest scores associated with other books by the same author, other books in the same series, other books in the same genre, and/or other items or categories. In this manner, an interest score associated with the given book may also affect an interest score associated with the author of the book, for example. In other embodiments, an item's interest score may be combined or aggregated with items that are different versions of the same underlying work, such as the hardcover and paperback versions of the same book. As another example, when the score module generates an interest score for a category of "ABC Company's Plasma Televisions," the score module may aggregate that interest score with interest scores associated with other companies' plasma televisions, other television categories, other items associated with the given company, and/or other items or categories. Depending on the embodiment, an interest score may be determined for a given category, such as a given company's products, based on either or both of an interest score generated for the company itself (such as by determining interest criteria based on forums associated with the company) and/or an aggregated interest score based on a plurality of interest scores determined for items associated with the company (such as products manufactured by the company).

In some embodiments, one or more filters may be applied based on how many items are associated with a given category prior to aggregating items within that category. For example, it may be determined that aggregation should not be performed in a category with a relatively large number of items, as this may indicate that the items are not as closely related as items in a more narrowly focused category. In some embodiments, the score module 125 may separately store in one or more data stores the interest score for the individual item or category as well as the aggregated interest score determined at block 312. In yet other embodiments, the individual item's interest score may be compared with the various aggregated interest scores in order to determine, for example, the extent to which interest or buzz associated with a category may be attributed to interest or buzz associated with that particular item within the category. Once the score module optionally aggregates the interest scores, the illustrated method ends at block 320.

Figure 4:
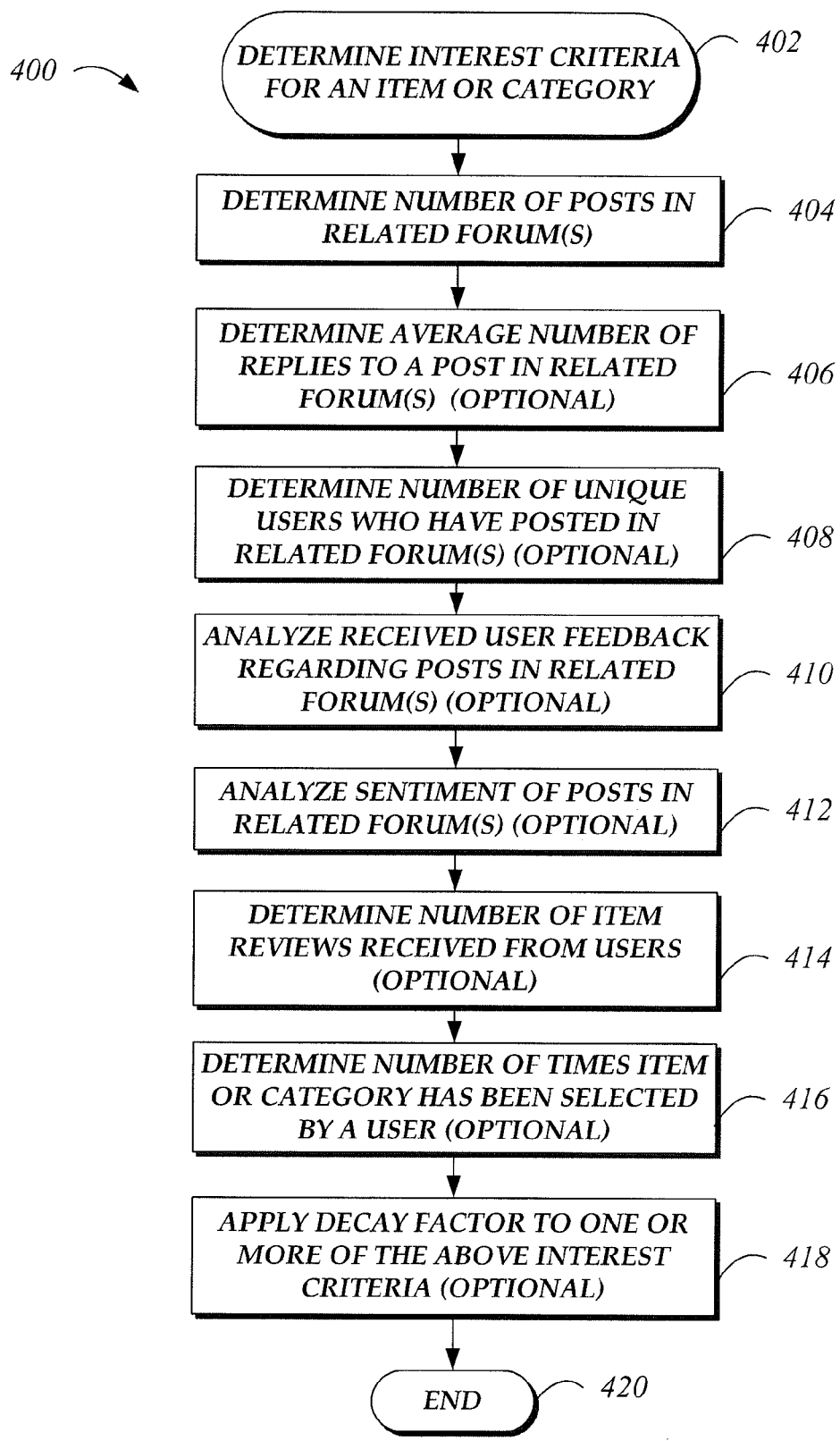
FIG. 4 is a flow diagram of an illustrative method implemented by the score module to determine interest criteria for an item or category.

FIG. 4 is a flow diagram of an illustrative method 400 implemented by the score module 125 to determine interest criteria for an item or category, such as at block 302 of FIG. 3. As noted in blocks 406-418, each of the interest criteria described in blocks 406-418 may be optional in certain embodiments. Accordingly, the score module 125 may determine an interest score based at least in part on various combinations of one or more of the interest criteria described in reference to FIG. 4. The illustrated method begins at block 402, then proceeds to block 404, where the score module may determine the number of posts in one or more forums related to or associated with the given item or category, such as the forum(s) determined at block 304 of FIG. 3. As discussed above, the one or more forums associated with an item may include forums that are specific to the item, and/or forums that are associated with a category with which the item is associated. In some embodiments, the number of posts determined at block 404 may include every post in the associated forums. In other embodiments, one or more filters may be applied based on content of posts in the related forums, such as by analyzing the text within the posts. For example, the score module may only count posts from category forums if the posts include a reference to the specific item, which may be determined, for example, based on keyword or pattern matching in the text. In some embodiments, one or more filters may be applied based on the user that submitted each post, such as to filter based on user demographics. For example, in response to a request to determine ranking information of items that are of interest to users in a particular geographic location or in a certain age group, posts may be filtered to only include posts by such users. As will be discussed below in reference to block 418, the number of posts in related forums may be filtered based on the time that the post was submitted by a user, such that only posts that have occurred in a certain time period (such as the last week, month, etc.) are counted. Additionally or alternatively, as discussed further below, a decay factor may be applied to the posts, such that older posts are effectively given less weight than more recent posts.

At block 406, the score module 125 may determine the average number of replies to a post in the one or more forums related to the item or category. A reply may generally be considered any post responsive to an earlier post in a forum. A relatively high average number of replies per post may be indicative of interest in the item or category, for example, because it indicates that users are actively engaging in discussion regarding the item or category. At block 408, the score module may determine the number of unique users who have posted in the one or more forums related to the item or category. For example, a forum with a high number of unique users posting in the forum may be more indicative of a high general user interest level in the item or category than a forum with the same number of total posts, but with fewer users posting (which could occur, for example, if two users engage in a lengthy multi-post discussion with each other).

Figure 8:
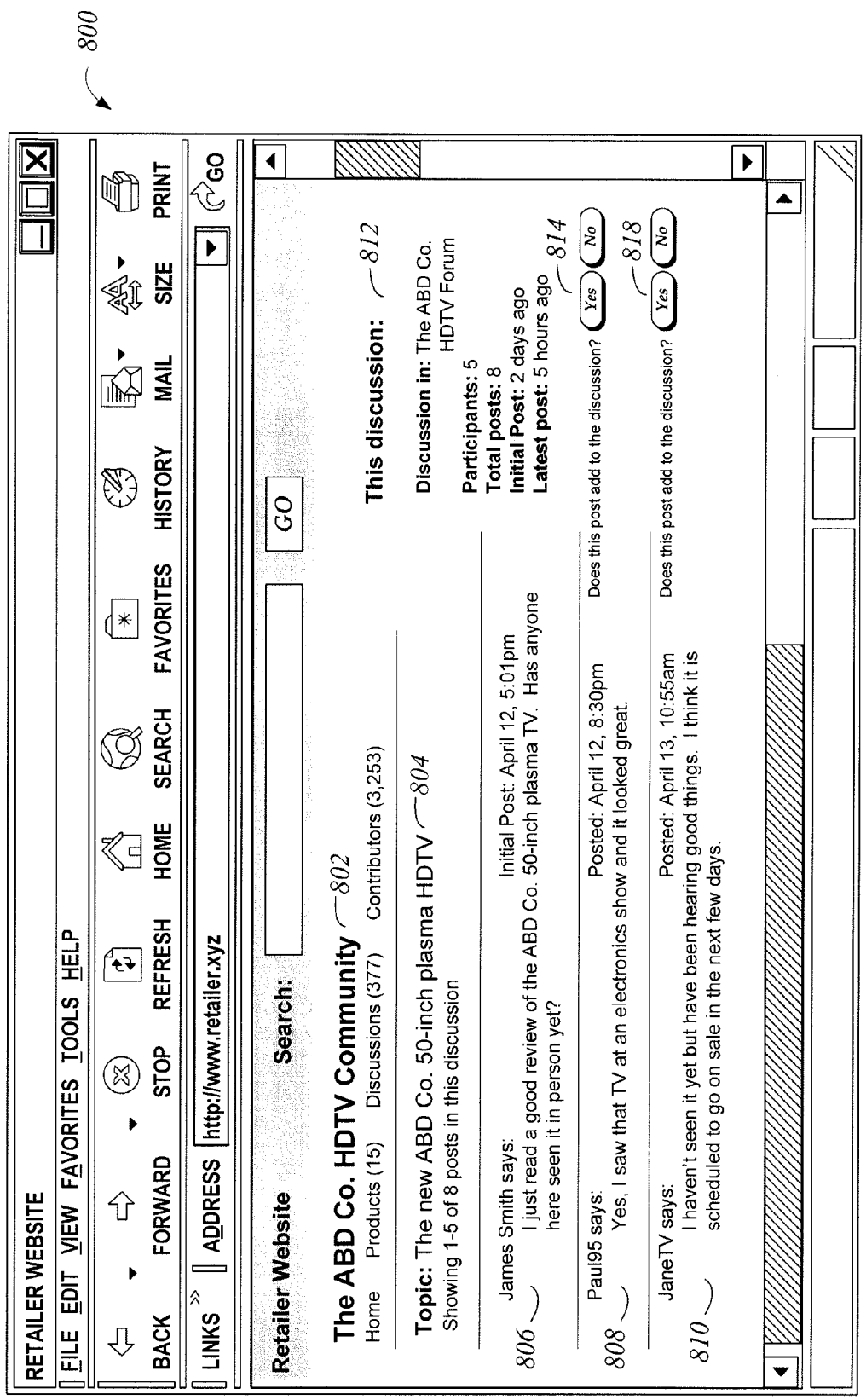
FIG. 8 is an illustrative user interface generated by the retail server that displays a discussion in a community forum that may be considered by the ranking server in determining customer interest in a category of items.

At block 410, the score module 125 may analyze user feedback regarding posts in the one or more forums related to the item or category. For example, in some embodiments, users presented with posts in a forum may be presented with selectable options to vote or otherwise indicate whether a given post or response added to the discussion (e.g., whether the post was helpful), such as illustrated in FIG. 8, discussed below.

At block 412, the score module 125 may analyze the sentiment of posts in the one or more forums related to the item or category. Sentiment analysis may include a broad range of natural language processing, computational linguistics and/or text mining techniques that generally aim to determine the attitude of the posting user. For example, an "excited" sentiment in a post may indicate the user's interest in the associated item or category. In some embodiments, however, a generally negative sentiment in a relatively high percentage of posts in a forum may still indicate a high interest or buzz in an associated item. For example, if the item is a political book, a lively discussion may occur that includes many posts that disagree with the book's content, but that nonetheless reflect general interest or buzz related to the book.

At block 414, the score module 125 may determine the number of item reviews of the given item (or items within the given category) received from users. For example, in some embodiments, user reviews may be stored separately from discussion forum data. An example user review is discussed below in reference to FIG. 7. In some embodiments, a large number of reviews for a given item may be indicative of user interest in the item.

At block 416, the score module 125 may determine the number of times that the given item or category has been selected by a user. For example, the score module may determine the number of times that a user has selected to view item information associated with the item, such as the number of times that an item detail page associated with the item has been requested by or shown to a user.

At block 418, the score module 125 may apply a decay factor to one or more of the interest criteria discussed above with reference to blocks 404-416. For example, one or more of the interest criteria may be decayed over time and/or be constrained to user activity that occurs in a certain period of time (for example, the past day, week, month, etc.). In some embodiments, for example, a decay factor may be applied when determining one or more of the interest criteria such that the relative weight of a given post, reply or review is effectively lowered over time. In some embodiments, the decay may occur at a rate similar to a half life, such that after a certain amount of time, a post is effectively accorded half of its original value, and then a quarter of the original value after twice that amount of time. In yet other embodiments, a simple rate of posts, responses or reviews may be determined, such as by dividing the total number of posts by the amount of time over which the posts occurred, rather than applying a decay factor. Moreover, multiple rankings may be determined using different decay rates, such as one ranking of items that have a high level of interest in recent days, and another ranking for items with a sustained interest or buzz over a longer period. Once the interest criteria have been determined and any decay factors have optionally been applied to the interest criteria, the illustrated method ends at block 420.

Figure 5:
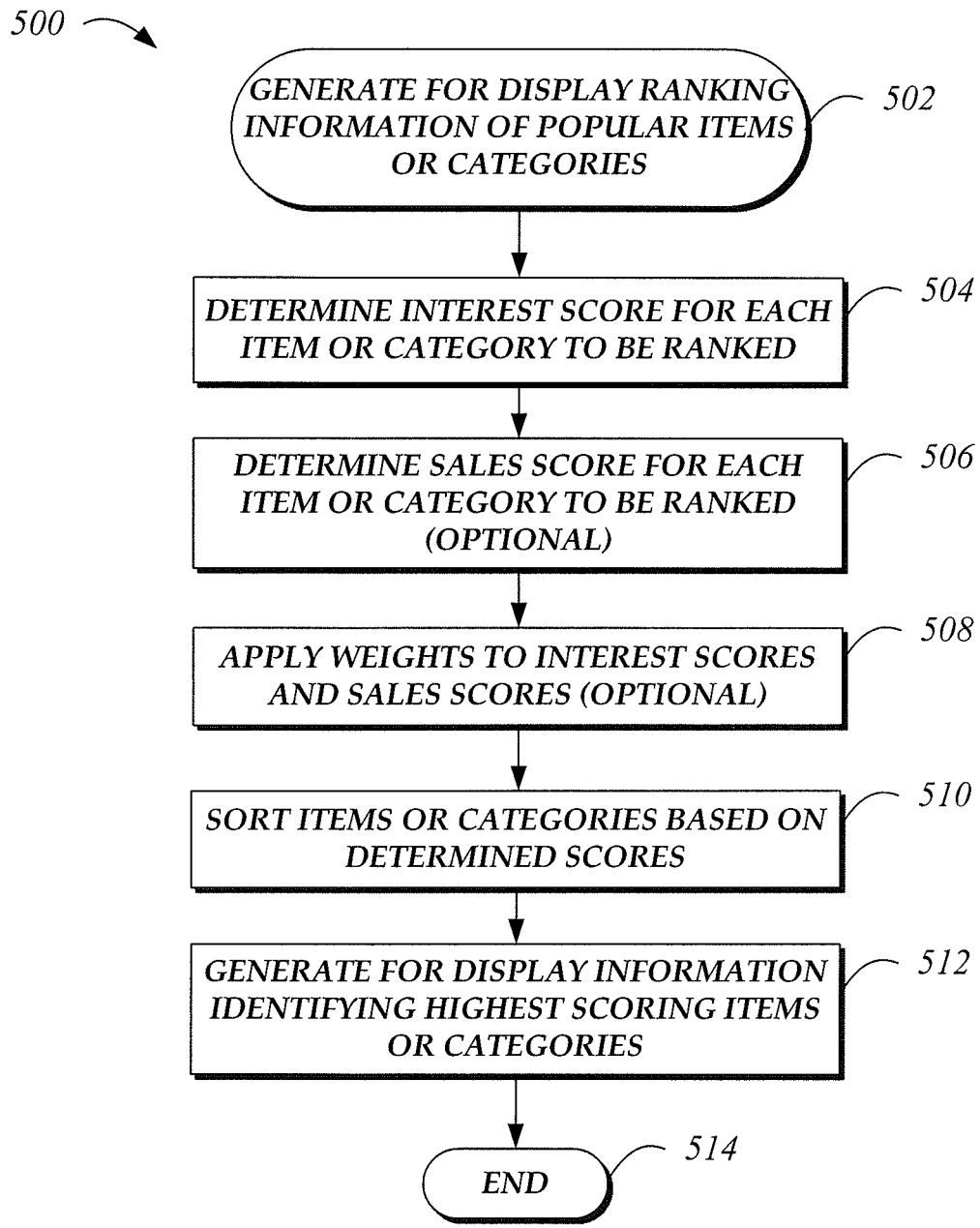
FIG. 5 is a flow diagram of an illustrative method implemented by the ranking server to generate for display ranking information of popular items or categories.

FIG. 5 is a flow diagram of an illustrative method 500 implemented by the ranking server 120 to generate for display ranking information of popular items or categories. Popular items or categories may be determined based at least in part on interest (or buzz). In some embodiments, popular items or categories may also be determined based at least in part on sales data associated with items or categories of items. Accordingly, a popularity ranking in such embodiments may be thought of as a combination of a sales ranking and an interest ranking. In some embodiments, the ranking server may generate ranking information for all items and/or categories stored in item data store 114, or a subset of the stored items or categories, on a regular basis (such as hourly, daily, weekly, etc.) or in response to predetermined triggering events. Alternatively, the ranking server may generate ranking information in response to a user request, which may be received via a user interface, such as the user interface illustrated in FIG. 6, discussed below.

The method begins at block 502, then proceeds to block 504, where the ranking server 120 determines an interest score for each item or category to be ranked, such as may be determined based on the methods discussed above in reference to FIG. 3. If the ranking server is ranking items, the items to be ranked may be, for example, the items in a certain category, such as all televisions or all electronics. If the ranking server is ranking categories, the categories to be ranked may be, for example, all categories that belong to the same larger category (e.g., all subcategories within a category may be ranked in order to determine the most popular subcategories within the given category).

At block 506, the ranking server 120 may determine a sales score for each item or category to be ranked. The sales score for an item may be retrieved from a data store, or may be determined by the ranking server based on item purchase data retrieved from a data store. The sales score may generally represent, depending on the embodiment, the quantity of items sold and/or the total revenue generated from sales of the item. In some embodiments, sales data may be decayed over time in a manner similar to the decay that may be applied to interest criteria, discussed above. In the case of categories, the sales score may represent a combined total, or combined average, of sales of items that belong to the category.

At block 508, the ranking server 120 may apply weights to the interest scores and sales scores of the items or categories to be ranked. For example, a predefined weight may be applied to each score, such as weighting the sales score as 80% of the popularity score for a given item or category, and the interest score as 20% of the popularity score. In some embodiments, the weights applied may depend on the category being ranked. As mentioned above, in other embodiments, the popularity ranking may be determined based on only one of the popularity score or the interest score. In some embodiments, separate rankings may be determined for interest, sales, and/or popularity (where the popularity ranking may be a combination of the interest and sales rankings).

At block 510, the ranking server 120 may sort the items or categories to be ranked based on the determined scores. For example, the ranking server may sort the items or categories to be ranked in descending order of popularity score, thereby creating an ordered list of the most popular items or categories among those ranked. The ranking server may then generate for display information identifying the highest scoring items or categories, such as the top X items or categories, where X may be predetermined by the ranking server or specified by a user. An example user interface displaying ranking information is discussed below in reference to FIG. 6. Once the ranking server has sorted the items or categories and generated for display information identifying the highest scoring items or categories, the illustrated method ends at block 514.

Figure 6:
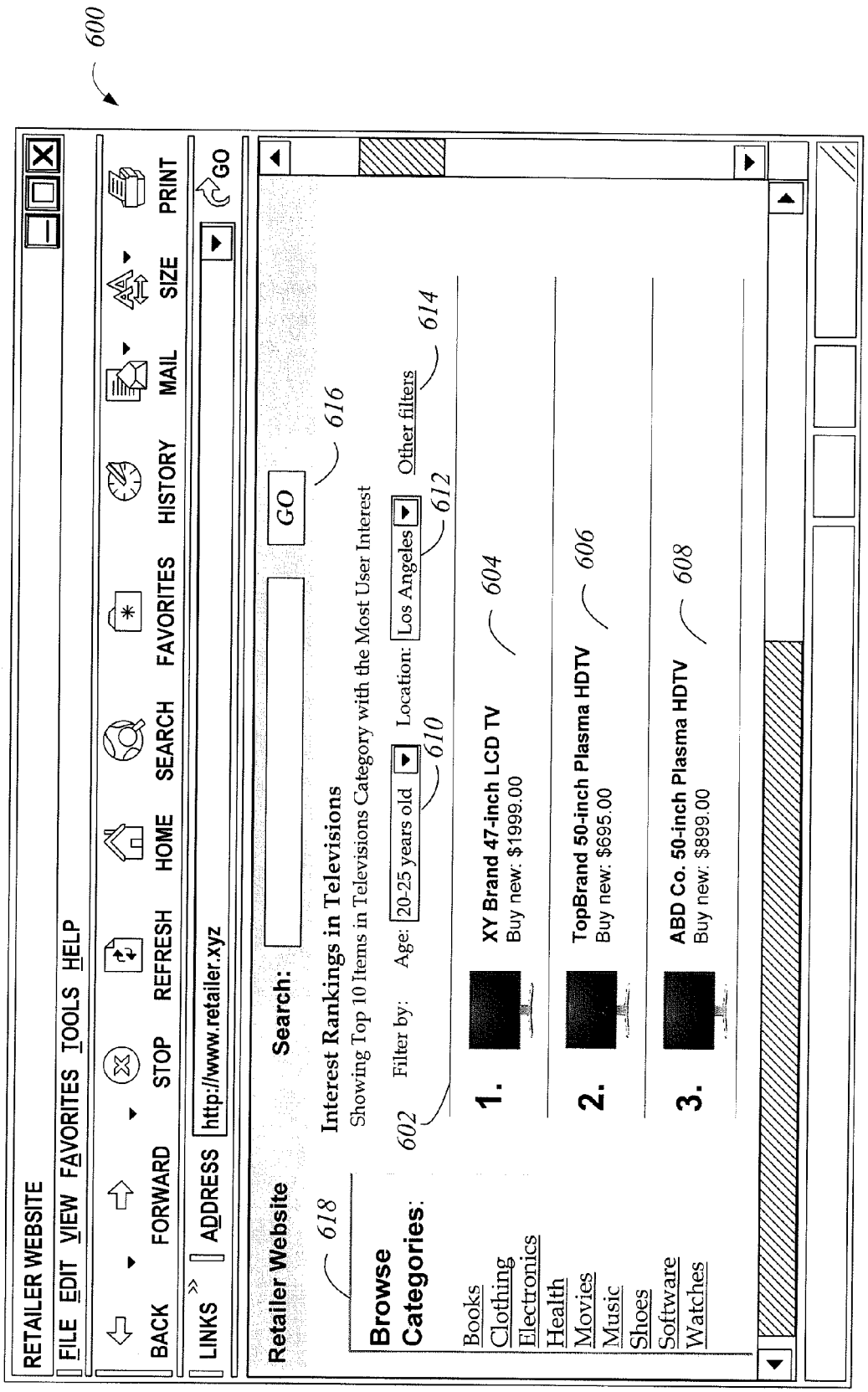
FIG. 6 is an illustrative user interface generated by the retail server and/or ranking server that includes interest ranking information determined by the ranking server.

FIG. 6 is an illustrative user interface 600 generated by the retail server 110 and/or ranking server 120 that includes interest ranking information 602 determined by the ranking server. As shown, the user interface 600 is displayed via a browser application operating upon a computing device, such as computing device 102, utilized by a user. As illustrated, user interface 600 includes selectable browse options 618, which include a listing of various item categories, each of which may include its own category forum. The user interface 600 may be presented, for example, after a user has requested to view rankings of the items with the most user interest or "buzz" in the televisions category. As illustrated, user interface 600 includes display of three of the top ten ranked items, items 604, 606 and 608. User interface 600 may have been generated after the ranking server determined the displayed interest ranking information, such as by illustrated method 500, discussed above. User interface 600 includes age filter criteria 610, location filter criteria 612 and other filters 614, each of which the user may select to filter the items displayed in rankings 602 based on the selected criteria. For example, as shown, the user may filter the rankings in order to view televisions that are of user interest to users ages 20-25 and/or user who live in Los Angeles. As discussed above, the filter criteria may limit the posts considered by the ranking server in determining interest criteria based on the user submitting the post. Similarly, in the case of popularity ranking information that considers sales data, sales data considered may be limited to users in a given geographic location, or such users' purchases may be weighted higher than other users' purchases. User interface 600 additionally includes a search field 616 in which the user may enter search criteria, such as by typing text in the field. In response to the entry of search criteria, the retail server 110 may generate a user interface that displays one or more items that match the search criteria.

While ranking information is shown in FIG. 6 as presented for display as a ranked list, in some embodiments, ranking information may have a variety of other applications. For example, the retail server 110 may recommend popular items to users, such as via a user interface or electronic mail. As another example, the retail server 110 may notify users that a popular item has been released in a category in which the user has expressed interest in or previously purchased items.

Figure 7:
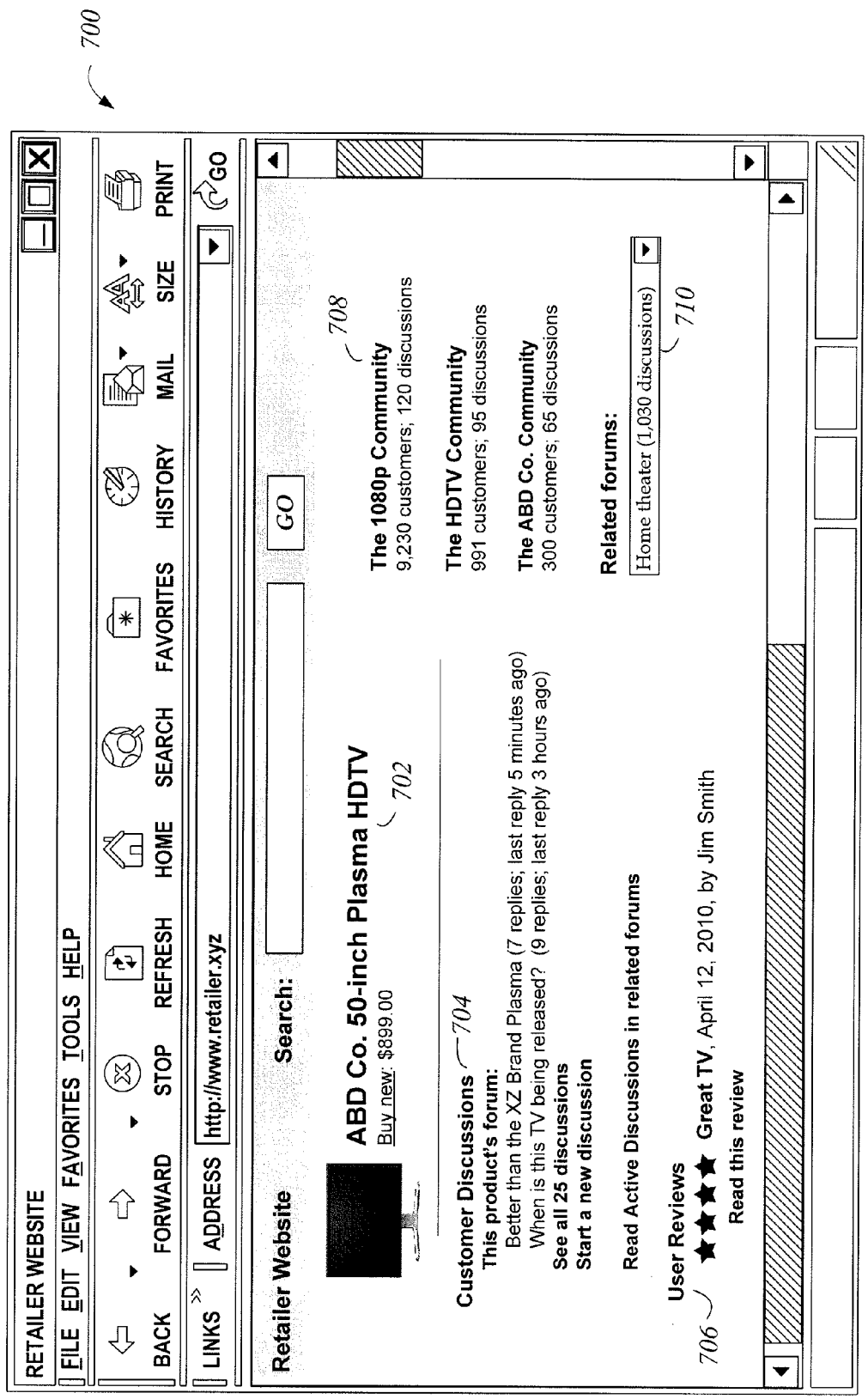
FIG. 7 is an illustrative user interface generated by the retail server that includes customer discussion information that may be considered by the ranking server in determining customer interest in an item.

FIG. 7 is an illustrative user interface 700 generated by the retail server 110 that includes customer discussion information 704 that may be considered by the ranking server in determining customer interest in item 702. In the illustrated example, the user interface 700 may be considered an item detail page for item 702, "ABD Co. 50-inch Plasma HDTV." The illustrative user interface includes display of related communities 708 (which may be selected by the user to request a different user interface which displays a community page, including a community forum). The user may select from menu 710 to view other forums related to item 702, which may include tag forums, category forums, community forums, or related item forums. These related forums may be considered by the ranking server, in some embodiments, in determining interest criteria for item 702. As illustrated in customer discussion information 704, the forum associated with item 702 includes twenty-five discussions, two of which have topics displayed. The two displayed topics are listed as "Better than the XZ Brand Plasma," which has seven replies, and "When is this TV being released?" which has nine replies. As illustrated, each of these posts has replies within the past few hours, which may indicate that item 702 has a relatively high level of customer interest. The illustrative user interface also includes user review information 706, which may be considered by the ranking server in determining interest criteria for item 702, as discussed above.

FIG. 8 is an illustrative user interface 800 generated by the retail server 110 that displays a discussion in a community forum for community 802, "The HDTV Community." The discussion may be considered by the ranking server in determining customer interest in a category of items (such as the "HDTV" category). User interface 800 includes a topic 804 and a first post text 806, which corresponds to text posted to the forum by a user ("James Smith"). User interface 800 includes two responses or replies, reply 808 and reply 810. Each reply includes selectable text 814 or 818 that enables the user to vote on whether the corresponding post or reply added to the discussion (e.g., whether the post was helpful). As discussed, such user feedback may be considered by the ranking server in determining interest criteria. User interface 800 also includes discussion information 812, which includes information which may relate to activity in the forum, such as the total number of posts, the number of participants, and when the latest post occurred.

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules executed by one or more general purpose computers or processors. The code modules may be stored in any type of computer-readable medium or other computer storage device. Some or all the methods may alternatively be embodied in specialized computer hardware. In addition, the components referred to herein may be implemented in hardware, software, firmware or a combination thereof.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A system comprising:
    an electronic data store configured to store data associated with a plurality of discussion forums; and
    a computing system comprising one or more hardware computing devices, said computing system in communication with the electronic data store and configured to at least:
    for each of a plurality of items:
    identify, in the electronic data store, a discussion forum associated with the item;
    determine a number of user posts in the discussion forum associated with the item;
    determine a number of users that correlate to selected demographic information and have participated in the discussion forum associated with the item; and
    determine an interest score for the item based at least in part on: (a) the determined number of user posts in the discussion forum associated with the item, (b) an analysis of user feedback regarding one or more user posts in the discussion forum associated with the item, and (c) the number of users that correlate to the selected demographic information and have participated in the discussion forum associated with the item; and
    generate a ranking for each of the plurality of items based at least in part on comparing the interest scores determined for the plurality of items.

2. The system of claim 1, wherein the interest score for each item is further determined based at least in part on a number of users participating in the discussion forum during a defined time period.

3. The system of claim 1, wherein generating the ranking for each of the plurality of items further comprises aggregating interest scores associated with two or more related items.

4. The system of claim 1, wherein determining the interest score for each item further comprises applying a decay factor to one or more of the user posts in the discussion forum based at least in part on a posting time associated with each user post.

5. The system of claim 1, wherein the computing system is further configured to at least generate a ranking for each of a plurality of item categories based at least in part on the interest scores determined for the plurality of items.

6. The system of claim 1, wherein the plurality of items comprise products represented in an electronic catalog.

7. A computer-implemented method comprising:
    as implemented by one or more computing devices configured with specific executable instructions,
    for each item of a plurality of items, identifying a discussion forum associated with the item;
    determining a number of user posts in each of the identified discussion forums;
    determining a number of users that correlate to selected demographic information and have participated in the discussion forum associated with each item;
    determining an interest score for each of the plurality of items, wherein the interest score for each item is determined based at least in part on: (a) the determined number of user posts in the discussion forum associated with the item, (b) an analysis of user feedback regarding one or more user posts in the discussion forum associated with the item, and (c) the number of users that correlate to the selected demographic information and have participated in the discussion forum associated with the item; and
    generating a ranking for each of the plurality of items based at least in part on comparing the interest scores determined for the plurality of items.

8. The computer-implemented method of claim 7, wherein the demographic information comprises at least one of geographic location or age range.

9. The computer-implemented method of claim 7, wherein the interest score for each item is further determined based at least in part on applying a decay factor to at least one user that participated in the discussion forum associated with the item, wherein the decay factor is based at least in part on a time at which the at least one user participated.

10. The computer-implemented method of claim 7, wherein determining the interest score for each item comprises applying a decay factor to one or more of the user posts in the discussion forum based at least in part on a posting time associated with each user post.

11. A computer-readable, non-transitory storage medium storing computer executable instructions that, when executed by one or more computing devices, configure the one or more computing devices to perform operations comprising:
    for each of a plurality of items:
    identifying, in an electronic data store, a discussion forum associated with the item;
    determining a number of user posts in the discussion forum associated with the item;
    determining a number of users that correlate to selected demographic information and have participated in the discussion forum associated with the item; and determining an interest score for the item based at least in part on: (a) the determined number of user posts in the discussion forum associated with the item, (b) an analysis of user feedback regarding one or more user posts in the discussion forum associated with the item, and (c) the number of users that correlate to the selected demographic information and have participated in the discussion forum associated with the item; and generating a ranking for each of the plurality of items based at least in part on comparing the interest scores determined for the plurality of items.

12. The computer-readable, non-transitory storage medium of claim 11, wherein the ranking for each item is further determined based at least in part on a sales score associated with the item, wherein the sales score is determined based at least in part on a number of users who have purchased the item.

13. The computer-readable, non-transitory storage medium of claim 12, wherein the ranking for each item is determined based at least in part on applying a weight to the interest score associated with the item and a weight to the sales score associated with the item.

* * * * *